(12) United States Patent
Walz et al.

(10) Patent No.: US 11,723,119 B2
(45) Date of Patent: Aug. 8, 2023

(54) ELECTRIC HEATING DEVICE

(71) Applicant: Eberspächer catem GmbH & Co. KG, Herxheim (DE)

(72) Inventors: Kurt Walz, Hagenbach (DE); Michael Niederer, Kapellen-Drusweiler (DE); Patrick Kachelhoffer, Seebach (FR)

(73) Assignee: Eberspächer catem GmbH & Co. KG, Herxheim (DE)

(*) Notice: Subject to any disclaimer, the term of this patent is extended or adjusted under 35 U.S.C. 154(b) by 379 days.

(21) Appl. No.: 16/945,097

(22) Filed: Jul. 31, 2020

(65) Prior Publication Data
US 2021/0037615 A1    Feb. 4, 2021

(30) Foreign Application Priority Data
Aug. 1, 2019    (DE) .......................... 102019211567.5

(51) Int. Cl.
*H05B 3/06*    (2006.01)
*H05B 3/10*    (2006.01)
(Continued)

(52) U.S. Cl.
CPC .............. *H05B 3/50* (2013.01); *H05B 3/06* (2013.01); *F24H 1/10* (2013.01); *F24H 1/102* (2013.01);
(Continued)

(58) Field of Classification Search
None
See application file for complete search history.

(56) References Cited

U.S. PATENT DOCUMENTS 4,626,666 A * 12/1986 Maeda ................. H05B 3/14
                                                          219/505
8,637,796 B2    1/2014 Bohlender
(Continued)

FOREIGN PATENT DOCUMENTS

DE           28 16 076          10/1979
DE      10 2008 052 918          6/2006
(Continued)

OTHER PUBLICATIONS

EP 3101365A1, Bohlender et al., Dec. 2016, Bib. data sheet (Year: 2016).*

(Continued)

*Primary Examiner* — Joseph M. Pelham
(74) *Attorney, Agent, or Firm* — Boyle Fredrickson S.C.

(57) ABSTRACT

An electric heating device includes a housing having a partition wall which separates a connection chamber from a heating chamber for dissipating heat and from which at least one receiving pocket, protruding into the heating chamber as a heating rib tapering towards its lower, closed end protrudes. A PTC heating element includes at least one PTC element and conductor tracks for energizing the PTC element with different polarities. The conductor tracks are electrically conductively connected to the PTC element and are electrically connected in the connection chamber. A pressure element is received which holds heat extraction surfaces of the PTC element abutted against oppositely disposed inner surfaces of the receiving pocket. The pressure element includes a sheet metal strip which, by punching and bending, forms spring segments protruding from the plane of the sheet metal strip. The spring elements are provided in a planar manner distributed over a heat extraction surface of the PTC element provided adjoining the respective pressure element.

7 Claims, 6 Drawing Sheets

(51) Int. Cl.
  *F24H 1/12* (2022.01)
  *F24H 9/1818* (2022.01)
  *H05B 3/50* (2006.01)
  *F24H 1/10* (2022.01)

(52) U.S. Cl.
  CPC .......... *F24H 1/121* (2013.01); *H05B 2203/02* (2013.01); *H05B 2203/021* (2013.01); *H05B 2203/023* (2013.01)

(56) References Cited

U.S. PATENT DOCUMENTS

| | | | |
|---|---|---|---|
| 8,946,599 B2 | 2/2015 | Niederer et al. | |
| 2008/0000889 A1* | 1/2008 | Niederer | F24H 3/082 219/205 |
| 2008/0099464 A1* | 5/2008 | Niederer | F24H 3/0429 219/520 |
| 2011/0147370 A1* | 6/2011 | Bohlender | B60H 1/2221 219/553 |
| 2013/0233845 A1* | 9/2013 | Bohlender | H05B 3/24 219/538 |
| 2015/0168014 A1* | 6/2015 | Wu | F24H 3/002 219/202 |
| 2016/0360572 A1 | 12/2016 | Bohlender et al. | |
| 2016/0360573 A1* | 12/2016 | Bohlender | H05B 3/18 |
| 2018/0037089 A1* | 2/2018 | Baek | B60H 1/2221 |
| 2018/0065447 A1* | 3/2018 | Cmelik | H05B 3/06 |
| 2021/0127456 A1* | 4/2021 | Salahub | F24H 1/009 |
| 2021/0215393 A1* | 7/2021 | Barbano | H05B 3/286 |
| 2021/0247105 A1* | 8/2021 | Salahub | H05B 3/78 |
| 2021/0360744 A1* | 11/2021 | Kachelhoffer | H05B 3/06 |

FOREIGN PATENT DOCUMENTS

| | | | |
|---|---|---|---|
| DE | 102019211565 A1 * | 2/2021 | ........... B60H 1/2221 |
| DE | 102019211569 A1 * | 2/2021 | ........... F24H 9/1827 |
| EP | 2637474 | 9/2013 | |
| EP | 3101365 A1 * | 12/2016 | ........... B60H 1/2221 |

OTHER PUBLICATIONS

EP 3101365A1, Bohlender et al., Dec. 2016, Descr. translation (Year: 2016).*

* cited by examiner

ELECTRIC HEATING DEVICE

BACKGROUND OF THE INVENTION

1. Field of the Invention

The present invention relates to an electric heating device with a housing having a partition wall which separates a connection chamber from a heating chamber for dissipating heat. At least one receiving pocket protruding into the heating chamber as a heating rib protrudes from the partition wall. A PTC heating element is provided in this pocket. Furthermore, a pressure element is accommodated in the pocket and holds heat extraction surfaces of the PTC element abutted against opposite inner surfaces of the receiving pocket.

2. Background of the Invention

The PTC heating element has at least one PTC element and conductor tracks abutting thereagainst in an electrically conductive manner. The conductor tracks are connected to the PTC element in an electrically conductively manner. This connection can be a positive-fit and/or force-fit and/or positive substance-fit connection.

The aforementioned general features of the electric heating device apply to the prior art according to EP 1 872 986 A1. They also apply to the implementation of the invention. The earlier proposals EP 2 637 474 A1 and EP 2 337 425 A1, respectively, originating from the applicant each disclose PTC heating elements which are introduced into a previously mentioned receiving pocket.

EP 2 337 425 A1 discloses a solution in which a conductor track abutting against a main side surface of the PTC element is provided as a piece of sheet metal with contact projections bent out of the plane of the piece of sheet metal. The contact projections only serve to improve the electric contact of the PTC element.

With the solutions described above, the PTC elements and the contact plates abutting thereto on both sides are typically braced with a wedge-shaped pressure element with the interposition of at least one insulating layer between the conductor tracks and the oppositely disposed inner surface of the receiving pocket in the latter. With a receiving pocket tapering towards its lower closed end, this wedge element ensures that the layers of the layer structure are clamped against one another. These layers are at least the PTC elements and the conductor tracks extending at right angles to the direction of force action of the wedge element, usually contact plates, and at least one insulating layer.

Despite the production-related cross-sectional shape of the receiving pocket tapering downwardly, the wedge element is to enable good heat transfer between the two mutually opposite heat extraction surfaces of the PTC element and the respective inner surfaces of the receiving pocket associated therewith with the interposition of the pressure element. Due to the pressure built up there, the oppositely disposed heat extraction surface of the PTC element is abutted directly or with the interposition of an insulating layer against the oppositely disposed inner surface of the receiving pocket.

This ensures good heat extraction. However, there is the problem that the receiving pocket does not always correspond to the designed shape due to manufacturing tolerances. For production reasons, the PTC elements are subject to considerable dimensional fluctuations. It is also not always ensured that the heat extraction surfaces of the PTC element run completely straight and planar.

Pressing in a wedge as a pressure element can lead to stress peaks, due to which the PTC element or a ceramic insulating layer can break inside the receiving pocket. Depending on the tolerances, the wedge element used as a pressure element in prior art in the specific application might not be thick enough, so that it basically sits uselessly at the lower end of the receiving pocket. If, on the other hand, the free space remaining before the wedge element is introduced is too small, then this results in insufficient coverage of the heat extraction surface of the PTC element in the vertical direction of the receiving pocket, i. e. between the lower end and the insertion opening. As a result, the PTC element heats up too much and prevents further uptake of power current. Consequently, the degree of efficiency of the PTC element is poor.

SUMMARY

The present invention seeks to provide a solution that remedies all or some of these issues.

In accordance with an aspect of the invention, an electric heating device a housing has a partition wall which separates a connection chamber from a heating chamber for dissipating heat. At least one receiving pocket, protruding into the heating chamber as a heating rib, protrudes into the housing. A PTC heating element is provided with at least one PTC element and conductor tracks for energizing the PTC element with different polarities. The conductor tracks are electrically conductively connected to the PTC element and are electrically connected to the connection chamber. A pressure element holds heat extraction surfaces of the PTC element abutted against oppositely disposed inner surfaces of the receiving pocket. The pressure element comprises a sheet metal strip and may be formed solely by the sheet metal strip. The sheet metal strip has spring segments formed by punching and bending from the plane of the sheet metal strip. The spring segments are, accordingly, formed integrally with the basic material of the sheet metal strip.

The sheet metal strip of the pressure element is typically shaped as a flat, planar sheet metal strip. Only the spring segments protrude from this sheet metal strip. The spring segments can protrude from one or both of the main side surfaces of the sheet metal strip. Spring segments can also be provided that each by itself projects from only one main side surface of the sheet metal strip. However, such spring segments can protrude from both main side surfaces.

The spring segments are provided surface-distributed over the heat extraction surface of the PTC element which is arranged adjacent to the pressure element. For this purpose, the pressure element typically abuts against the PTC element with the interposition of a conductor track. However, the pressure element can also cause the layers of the layer structure to be braced, and it can also be the conductor track of the layer structure and then abut directly against the heat extraction surface of the PTC element. With this configuration, the pressure element forms one of the conductor tracks. The pressure element and the conductor tracks are embodied by a single element. When operating the electric heating device with the normal vehicle electrical system voltage of 12 V, such a pressure element can, for example, connect the PTC element in a directly conductive manner to the inner surface of the receiving pocket which can connect to ground and is electrically conductively connected to a ground connection that is provided by the electric heating device. An insulating layer that separates the current path from the housing and thus from the receiving pocket can be dispensed with for voltages up to 25 VAC or up to 60 VDC.

The pressure element configured as a conductor track can also be arranged between two PTC elements accommodated in the receiving pocket and can abut directly thereagainst for energization. They then typically abut against oppositely disposed main side surfaces of the PTC elements. The respective main side surfaces of the PTC elements opposite thereto can each be connected in an electrically conductive manner to the inner surface of the receiving pocket and thus connected to ground. Alternatively, the last-mentioned main side surfaces can also be contacted with a contact plate, the connection lug of which protrudes into the connection chamber and which are provided on the outside with an electrical insulating layer. In the assembled state, this insulating layer is provided between the respective PTC element and the inner surface of the receiving pocket and is clamped therebetween. The PTC elements are then not electrically connected to the receiving pocket. It can also abut against the PTC elements with the interposition of an intermediate layer which for energization are in this case electrically connected to a conductor track, for example, in the form of a contact plate, located between the PTC element and the insulating layer.

However, the pressure element can also abut against the inner surface of the receiving pocket with the interposition of an insulating strip and/or be provided with an electrical contact element which is exposed in the connection chamber of the electric heating device. In such a case, the power current is introduced into or discharged from the PTC element from the connection chamber via the pressure element and is electrically insulated from the receiving pocket.

The pressure element according to the invention is configured for the geometric adaptation of the typically plane-parallel outer surfaces of the PTC heating element to the conical cross-sectional shape of the receiving pocket. The pressure element according to the present invention is in particular adapted in the vertical direction to the conical shape of the receiving pocket. The spring elements provided at the lower end of the receiving pocket there protrude less far from the planes formed by the sheet metal strip than the spring segments provided at the upper end of the receiving pocket. In a side view of the pressure element, a wedge-shaped envelopment surface then arises, the tip end of which typically lies in a plane which is defined by the planar base surface of the sheet metal strip. In the case of spring segments projecting only on one side from the basic material of the sheet metal strip, the wedge-shaped envelopment surface is formed, firstly, by the planar base surface of the sheet metal strip facing away from the spring segments and, secondly, by a connecting line which approaches those surface points of the spring segments which have the furthest transverse distance to the base surface of the sheet metal strip.

The surface distribution of the spring segments is typically such that the spring segments are provided substantially distributed over the entire heat extraction surface of the PTC element. Because, in the installed position of the pressure element, the spring segments are to abut the PTC element and the other layers of the layer structure provided in the receiving pocket in a braced manner against one another, so that excessively high transition resistance at the phase boundaries transferring the heat to the mutually opposite inner surfaces of the receiving pocket is avoided. In the vertical direction, the spring segments can have a larger dimension than the heat extraction surface of the associated PTC element. This takes into account the fact that the pressure element is pressed into the receiving pocket to different depths depending on the manufacturing tolerance. In the width direction extending transversely to the vertical direction, several spring segments are typically provided one behind the other in a row which extends transversely to the vertical direction. In the width direction, the arrangement of the spring segments is adapted to the size of the heat extraction surface of the PTC element. For example, the respective spring segments that are in the width direction on the outer side in the edge region of the PTC element press onto the latter's heat extraction surface. The spring segments, with their sections furthest away from the sheet metal strip, can form planar rectangular surfaces via which the respective contact pressure of the corresponding spring segment is directly or indirectly transmitted to the associated PTC element. The rectangular surfaces accordingly run parallel to the contact surface against which the spring segments abut.

The partition wall of the electric heating device according to the present invention can be formed integrally with the receiving pocket. This embodiment lends itself to an electric heating device in which a housing lower part defines a circulation chamber into which the receiving pocket protrudes in the manner of a heating rib and forms the inlet and outlet openings for the flow of a medium to be heated in the heating chamber, where the corresponding housing part is produced by way of extrusion or die-casting aluminum. In this respect, an embodiment of the electric heating device according to the invention corresponds to the embodiment described in EP 1 872 986 A1. The same applies to the electrical connection of the conductor tracks in the connection chamber which is provided on the side of the partition wall opposite the circulation chamber and typically electrically connects several PTC heating elements via a printed circuit board and/or via a control unit provided in the connection chamber to the PTC heating elements enables actuating individual or all PTC heating elements of the electric heating device. For this purpose, the conductor tracks typically have connection lugs which on their free portion project over the receiving pocket and are exposed in the connection chamber. The conductor tracks can be formed in a manner known per se by contact plates which form the connection lug at their free end.

The pressure element as such can be formed from spring-rigid material, where a material should be selected that also exhibits good thermal conductivity. For example, spring-rigid aluminum, copper or brass is preferable to steel sheet due to the improved thermal conductivity.

Between three and six spring segments may be provided successively between the lower and the upper end of the receiving pocket. As previously mentioned, several spring segments may be arranged in a row in the width direction. These may be rows which are provided and aligned parallel to one another. However, this configuration is not essential. It is only essential that the heat extraction surface is acted upon in a planar manner to the degree possible by the pressure that is caused by each of the spring segments.

According to a preferred development of the present invention, a heater housing made of insulating material is provided and joins the PTC element and the conductor tracks to form a unit and guides the pressure element in a slidable manner. Such a heater housing typically consists of insulating material, such as plastic material or ceramic material. For guiding the pressure element, the heater housing has a sliding guide which extends substantially in the vertical direction. The heater housing can be adhesively bonded to one or both conductor tracks. It is also possible to injection-mold-coat the conductor tracks with the interposition of the PTC element(s) during the injection molding process of manufacturing the heater housing from plastic material. This creates one entity. The sliding guide typically has mutually opposite guide slots in which an edge region of the sheet metal strip comprising no spring segments is guided in a slidable manner. The heater housing can also accommodate the at least one insulating layer and position it relative to the contact plate. The heater housing can also have a sliding plate provided between the heat extraction surface of the PTC element and the pressure element in order to obtain further uniformity of the contact pressure which is caused by the individual spring segments. However, the present invention preferably does without such a sliding plate, since the configuration of the spring segments and the thickness of the sheet metal strip are selected such that the rather punctiform pressure load caused by each individual spring segment remains subcritical, so that mechanical damage to the PTC element and/or other layers of the layer structure, in particular the insulating layer, is not to be feared.

In order to improve the thermal conductivity in the region of the pressure element, it is proposed according to a preferred development of the present invention to fill the free spaces which are pressed free by the spring segments with thermally conductive material. This thermally conductive material may be a thermally high-conductive mass. The thermal conductivity should be at least 3 W/(m K). The mass is typically of such nature that it allows for a certain motion of the PTC heating element in the receiving pocket to compensate for thermal stresses that occur during the typical temperature changes. The material should inserted after the PTC heating element has been inserted into the receiving pocket and after the pressure element has been pushed in the vertical direction relative to the layers of the layer structure and for bracing the same in the receiving pocket when the PTC heating element is positioned relatively in the receiving pocket In other words, the PTC heating element is first introduced into the receiving pocket. The pressure element is thereafter introduced into the receiving pocket or, if the pressure element has already been introduced with the PTC heating element into the receiving pocket, is pushed relative to the layer structure in order to preload the layer The pressure element according to the invention also has the wedge shape described above, at least when the housing is manufactured by way of pressure die casting. Because a wedge-shaped receiving pocket can hardly be avoided with this method. However, the present invention can also be implemented with non-wedge-shaped receiving pockets. The spring segments can each be configured in such a way that they resemble a planar contact surface with their contact points or surfaces, or they abut against a contoured or randomly inclined surface, and trace the latter's contours via abutment points or surfaces formed by the individual spring segments.

Once the layers of the layer structure have been braced in the receiving pocket by the pressure element, the mass is filled into the pocket. This mass may fill all the free spaces in the pocket so that good heat transfer from the PTC element to all inner surfaces of the pocket arises, including the end faces thereof. The mechanical bracing is maintained by the spring segments of the pressure element. The mass may be a permanently elastic mass, so that a certain flexibility of the mass is also given and the spring segments can also follow certain compensatory motions during operation which arise, for example, due to the thermal expansion of the individual layers of the layer structure. A suitable mass is e.g. two-component silicone which can be filled with ceramic particles to improve thermal conductivity.

BRIEF DESCRIPTION OF THE DRAWINGS

Further details and advantages of the present invention shall become apparent from the following description of an embodiment in combination with the drawing, in which.

DETAILED DESCRIPTION

Figure 1:
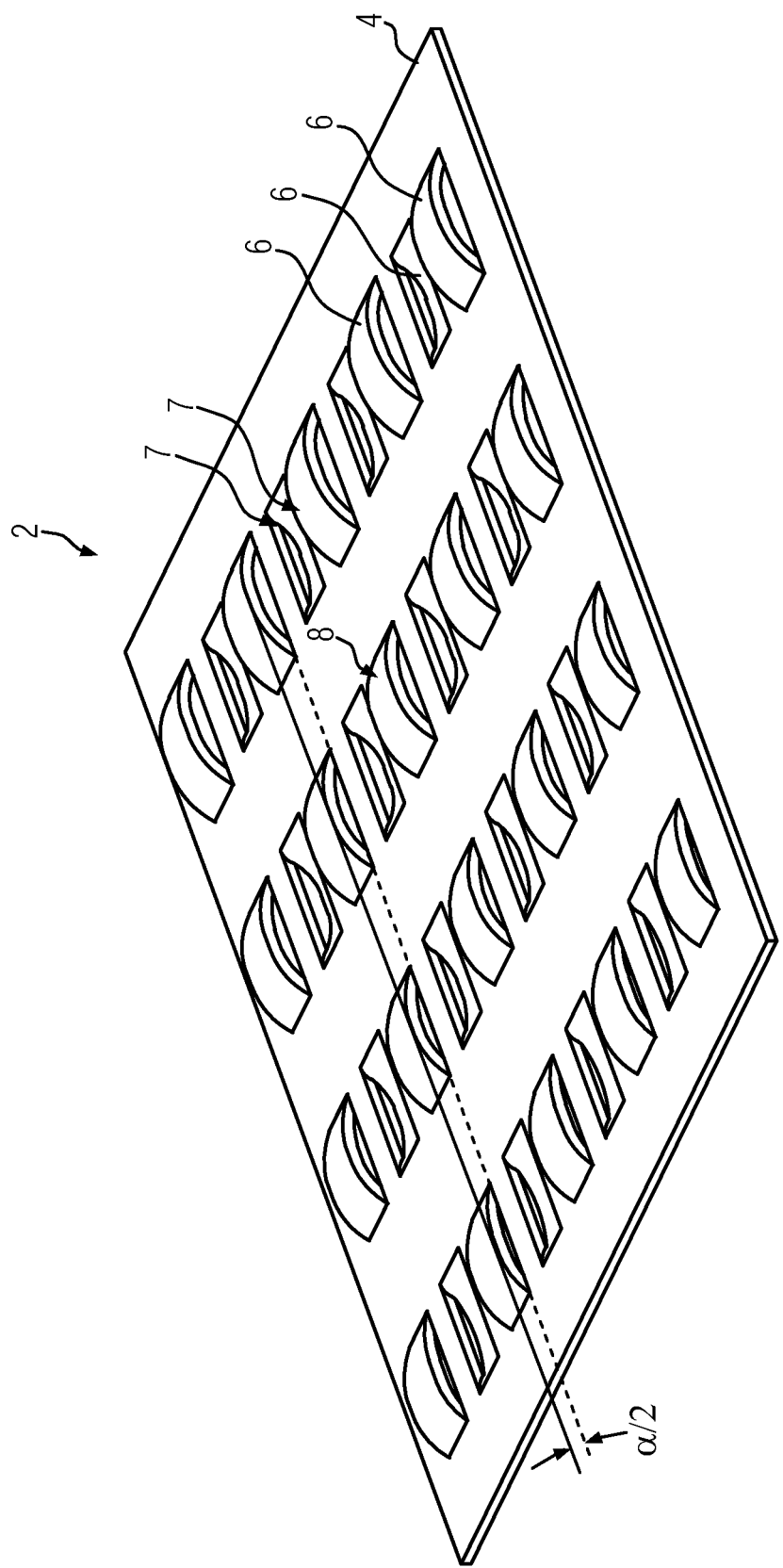
FIG. 1 shows a perspective top view of an embodiment of a pressure element according to the invention.

FIG. 1 shows an embodiment of a pressure element 2 according to the invention comprising a sheet metal strip identified with reference number 4 from which spring segments 6 are worked out by punching and bending. The spring segments 6 are formed by punching out lateral edges 7 and bending tabs 8 resulting therefrom. The tabs 8 are each connected with one of their two end sides to the base material of the sheet metal strip 4. This results in spring segments 2 having a relatively high spring rigidity.

It can be seen that each first spring segment 6 of a row with parallel spring segments 2 is bent out toward the one side and each second spring segment 6 to the other side of the sheet metal strip 4

A straight line can be applied at the respective outer surface points of the individual spring segments 6. The straight lines disposed opposite one another and connecting the metal strips 4, of which only straight line I on the face side is fully shown in FIG. 1 and the other straight line II is only indicated, form an angle of less than 10° between them; cf. FIG. 3.

Figure 2:
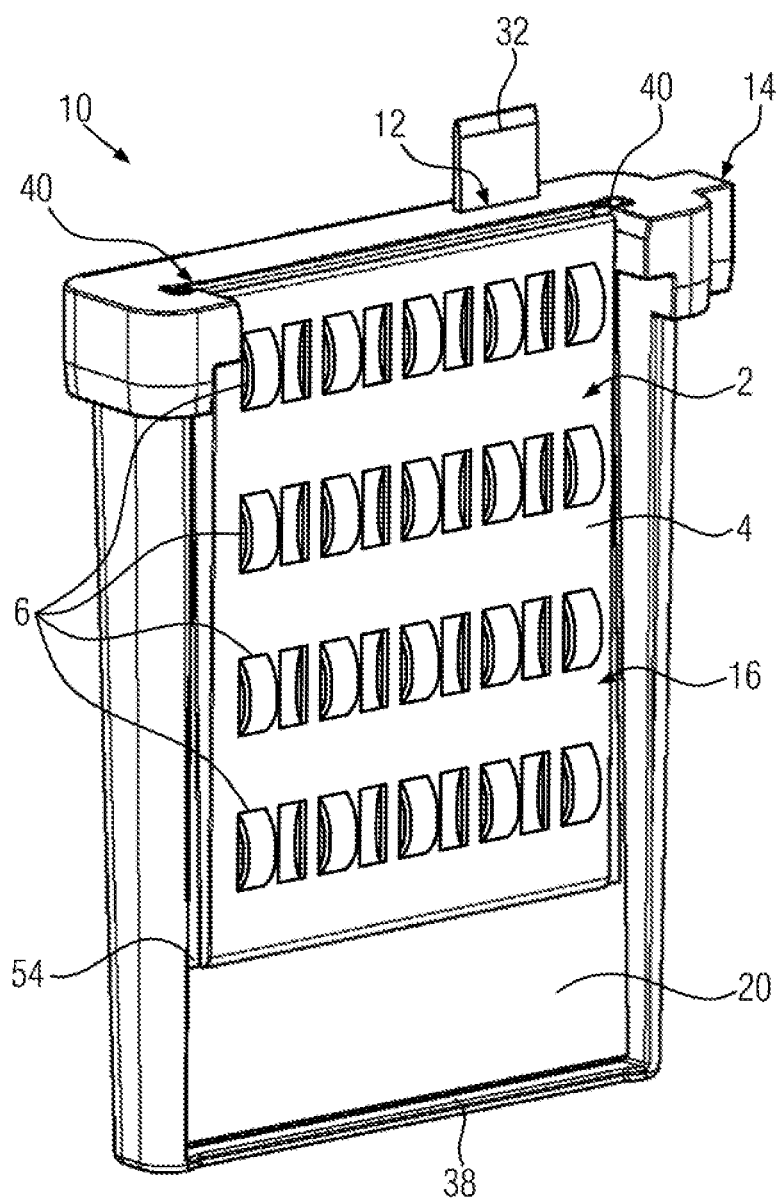
FIG. 2 shows a perspective side view of an embodiment of a heater housing with the pressure element according to FIG. 1.
Figure 3:
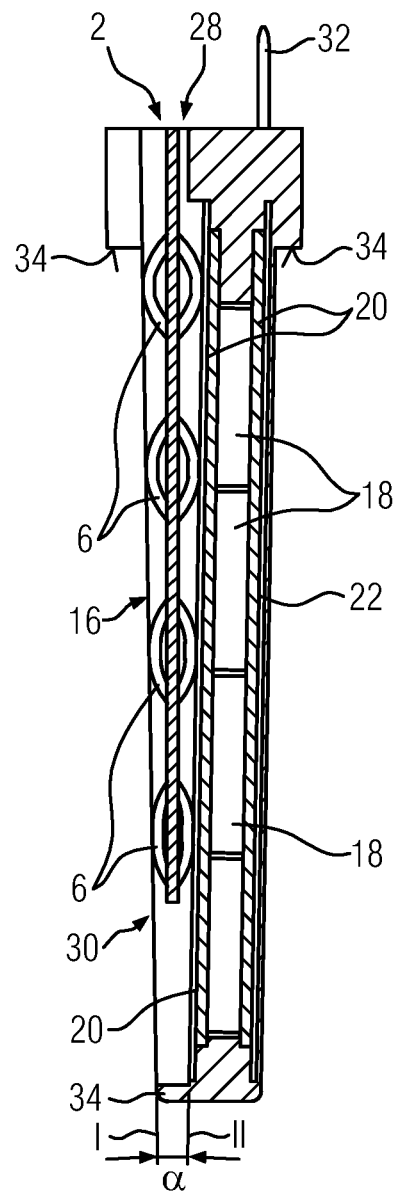
FIG. 3 shows a cross-sectional view of the embodiment shown in FIG. 2.
Figure 4:
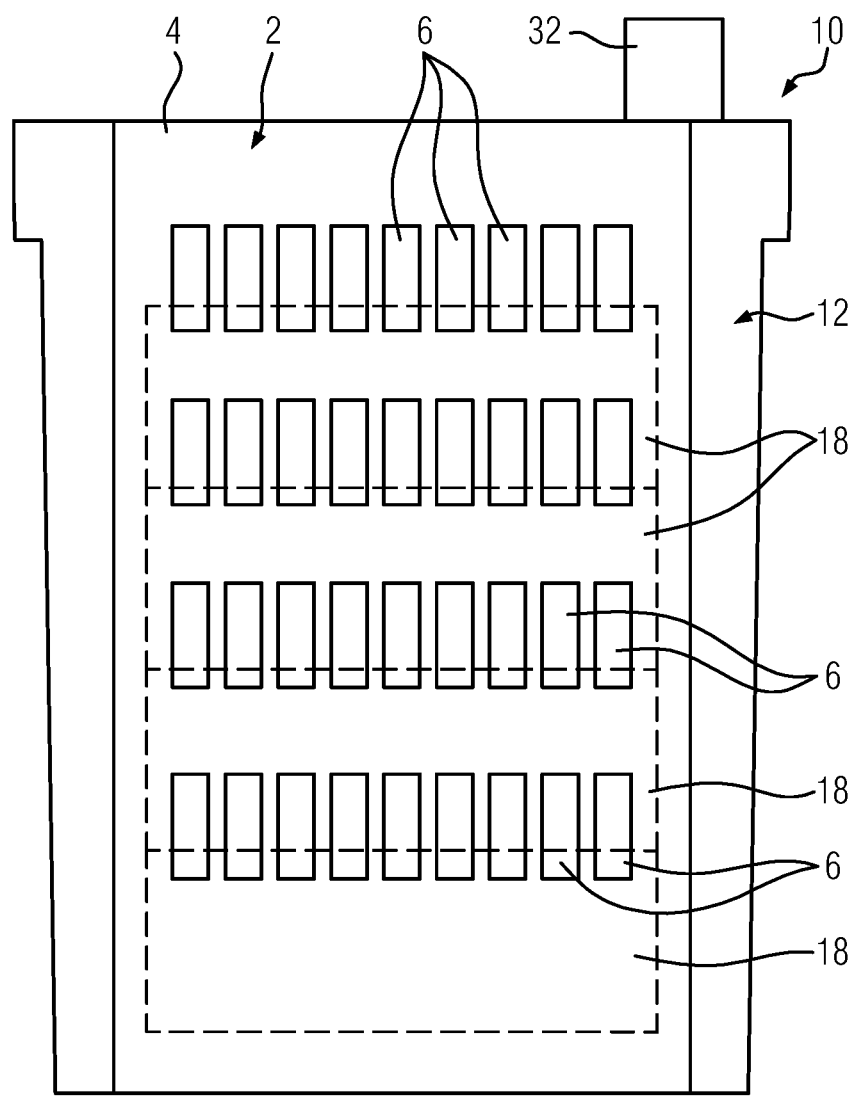
FIG. 4 shows a top view onto the embodiment shown in FIGS. 2 and 3.

Details of the PTC heating element can be gathered from FIGS. 2 to 4. The PTC heating element is identified there with reference number 10 and has a heater housing 12 made of plastic material which is formed to be frame-shaped with an upper rim 14 projecting beyond the frame in the thickness direction and a frame opening 16 in which four PTC elements 18 are provided one above the other. As shown in FIG. 3, conductor tracks in the form of contact plates 20 abut in an electrically conductive manner against both sides of the PTC elements 18. The contact plates 20 are connected to the heater housing 12, for example, by adhesive bonding. On one side (the right one in FIG. 3), the contact plate 20 is covered with an insulating layer 22. This insulating layer can be a plastic film or a ceramic plate or a combination of a ceramic plate with a plastic film. The plastic film is typically located on the outer side of the ceramic plate, which has the advantage that the plastic film can compensate for a certain roughness on an inner surface of a receiving pocket and thus absorb stress peaks that could impair the ceramic layer. The receiving pocket is marked with reference number 24 in FIGS. 5 and 6. The inner surface in FIG. 6 with reference number 26.

On the side opposite the insulating layer 22, the contact plate 20 there forms the outer surface of the layer structure. The pressure element 2 already described in FIG. 1 is disposed adjoining this outer surface. FIGS. 2 and 3 show the pressure element 2 before the layer structure is braced in the receiving pocket 24. The pressure element 2 is in a raised position. The upper end 28 of the pressure element 2 is located in the region of the rim 14. The lower end of the pressure element 2, identified with reference numeral 30, is located at the medium height of the lower PTC element 18.

Figure 5:
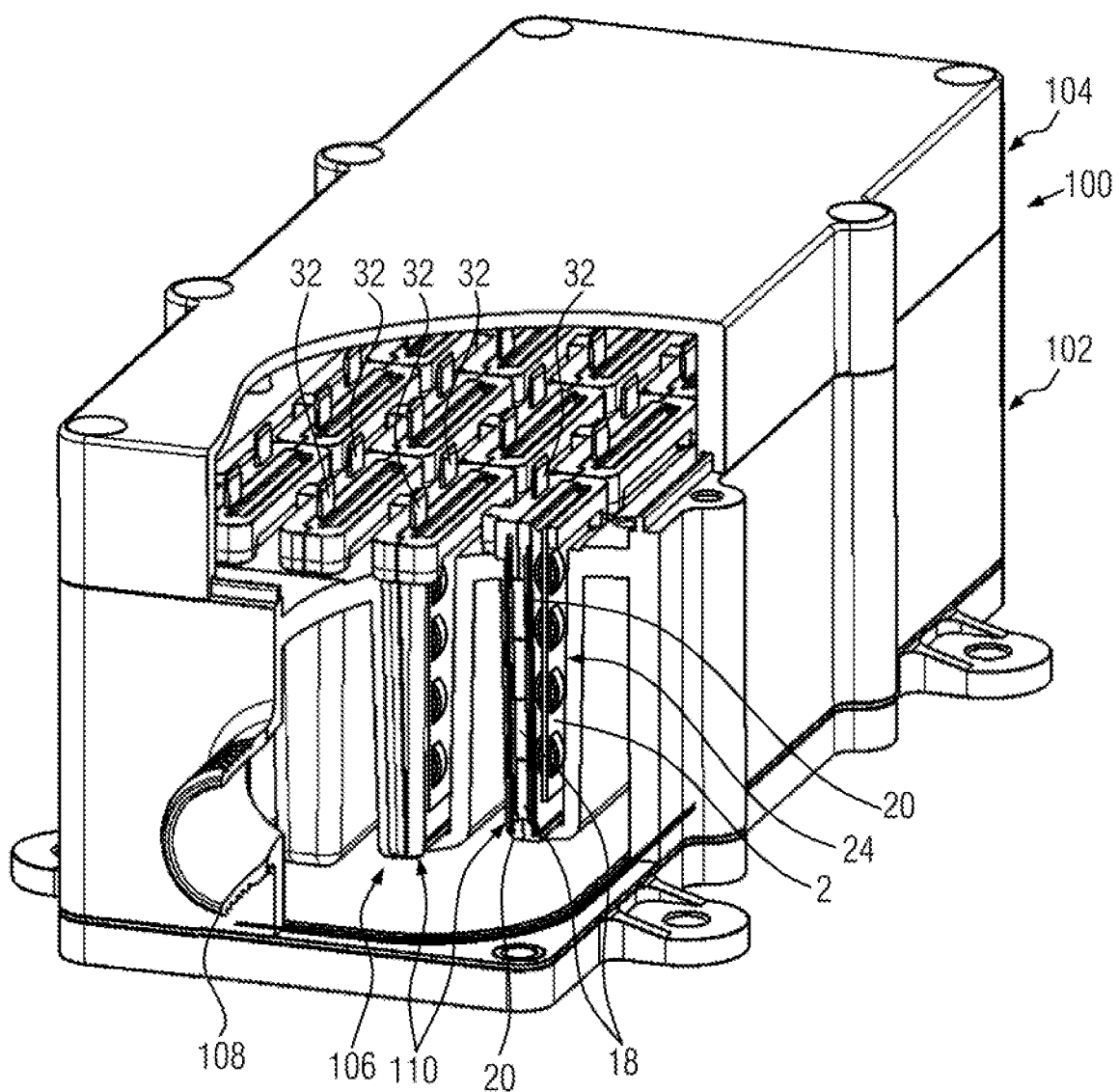
FIG. 5 shows a perspective face view of an embodiment of an electric heating device with the heater housing partially removed.

The assembly of the heater housing 12 and the pressure element 2 shall be explained below with reference to FIGS. 5 and 6. They show an embodiment of an electric heating device with a heater housing 100 having a housing base 102 and a housing cover 104. The housing base 102 comprises a circulation chamber 106 which is connected via ports, of which only one port 108 is shown in FIG. 5, to a line for a liquid fluid to be heated. The electric heating device is, in particular, an electric heating device in a motor vehicle. The circulation chamber 106 is penetrated by several heating ribs 110 extending in the longitudinal direction of the housing base 102 and in a cross-sectional view having a substantially U-like cross-sectional shape and are circumferentially enclosed with respect to the circulation chamber 106. These heating ribs 110 form the previously mentioned receiving pocket 24. In the embodiment shown, the electric heating device 4 has adjacently disposed pockets which extend substantially over the entire length of the housing base 102. The receiving pockets 24 are considerably longer than the heater housing 12. In the longitudinal direction of the receiving pocket 24, several heater housings 12 fit one behind the other into the receiving pocket 24 (cf. FIG. 5).

The housing base 102 forms a partition wall 112, which separates the circulation chamber 106 from a connection chamber 114, in which connection strips 32 are exposed which are electrically conductively connected to the contact plates 20, are presently formed integrally thereon. In the embodiment shown in FIGS. 5 and 6, two connecting lugs 32 are provided for each PTC heating element 10 for energizing the PTC elements 18 with different polarities.

The embodiment according to FIGS. 2 to 4 can be guided by the contemplation that the power current for energizing the PTC elements 18 drops to ground, which in the present case can be formed by the housing base 102, so that only one of the contact plates 20 needs to be connected to a connection lug 32, whereas the other polarity is given through the electrical connection of the housing base 102 to ground. The power current then flows over the inner surface 26 and through the pressure element 2.

Both connection options are conceivable.

For the assembly, the PTC heating element 10 is pushed into the receiving pocket 24 until a stop 34 formed by the rim 14 abuts against the upper side of the partition wall 112. As a result, the heater housing 12 and therefore the PTC heating element 10 is positioned relative to the housing 100. The insulating layer 22 is then disposed immediately adjacent to the corresponding inner surface 26. On the opposite side, the pressure element 2 is in its initial position between the inner surface 26 and the associated contact plate 20. The layers of the layer structure are not yet abutted against each other under preload.

The pressure element 2 is now pushed towards the lower end of the receiving pocket 24 which is identified with reference numeral 36. The spring segments 4 are resiliently preloaded with this relative motion of the pressure element 2. To the same way, the layers of the layer structure are abutted against one another and the insulating layer 22 against the associated inner surface 26 of the receiving pocket 24. The introduction of the pressure element 2 in this manner can be path-controlled or force-controlled. The force there is the degree of tension in the layers of the layer structure. After a certain preload force corresponding to an axial compressive force for introducing the pressure element 2 has been reached, the insertion motion of the pressure element 2 into the receiving pocket 24 can terminate.

Alternatively or in addition, a lower stop can be provided which defines the maximum insertion distance of the pressure element 2. Such a lower stop can be formed, for example, by a cross web formed at the lower end of the heater housing 12 and identified with reference numeral 38 in FIGS. 2 and 3. Alternatively, such a cross web can be omitted, so that the insertion motion of the pressure element 2 is defined by the lower end 36 of the receiving pocket 24. The sheet metal strip 24 can equally well be provided wider than a sliding guide for the pressure element 2, identified with reference numeral 40, which is formed on the heater housing 2 and can be seen in FIG. 2. This widening on the upper side forms a stop which interacts with the rim 14 and defines the maximum insertion depth of the pressure element 2.

Figure 6:
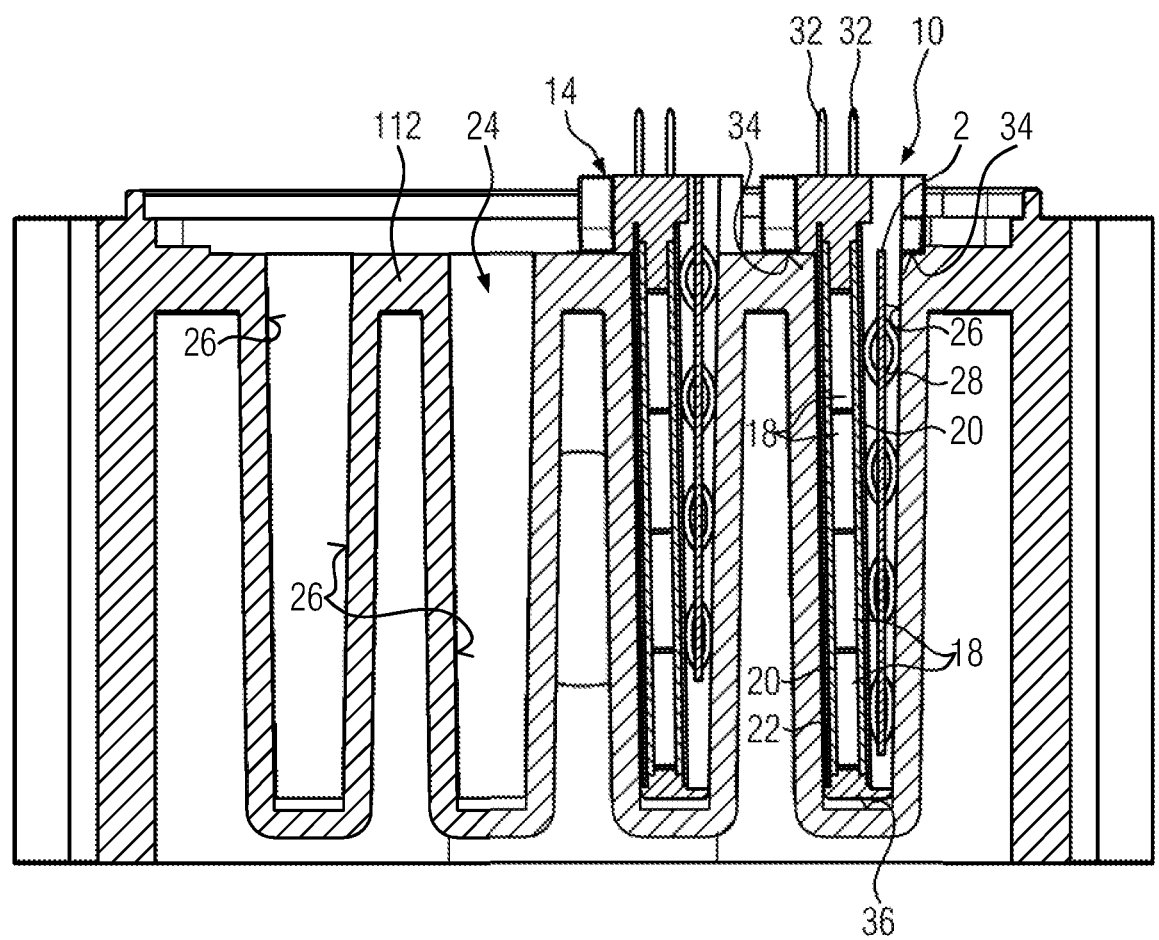
FIG. 6 shows a cross-sectional view of the embodiment shown in FIG. 4.

FIG. 6 shows the pressure element 2 in the receiving pocket 24 on the right-hand side after the introduction into the receiving pocket 24 and in the receiving pocket 24 provided on the left-hand side adjacent thereto prior to the introduction for bracing the elements of the layer structure. The spring segments 4 have deformed resiliently as a result of the insertion. The layers of the layer structure are abutted against each other. The layer structure is abutted in a planar manner on the side opposite the pressure element 2 against the inner surface 26 provided there. Pressing the pressure element 2 into the receiving pocket 24 can be carried out with a tool which on one face side has a groove that is adapted to receive the sheet metal strip 4 and that grips the sheet metal strip 4 at the end.

Thereafter, a preferably permanently elastic plastic mass, to which good heat-conductive but electrically non-conductive filler particles are added, for example, particles made of aluminum oxide, can be filled into the receiving pocket 24 in order to fill it entirely and to displace the air remaining therein. This results in good heat conduction between the elements of the layer structure and all surfaces defining the receiving pocket 24 on the inside.

We claim:

1. An electric heating device comprising:
   a housing having a partition wall which separates a connection chamber from a heating chamber for dissipating heat;
   at least one receiving pocket, which protrudes into the heating chamber as a heating rib and which protrudes from the housing;
   a PTC heating element including at least one PTC element and conductor tracks for energizing the PTC element with different polarities, the conductor tracks being electrically conductively connected to the PTC element and being electrically connected in the connection chamber; and
   a pressure element which is received in the connection chamber and which holds a first outer surface of the PTC heating element abutted against one of oppositely disposed inner surfaces of the receiving pocket, wherein the pressure element comprises a sheet metal strip which forms spring segments which protrude by punching and bending from a plane of the sheet metal strip, the spring segments being distributed in a planar manner over a second outer surface of the PTC heating element that adjoins the respective pressure elements, wherein the spring segments abut against the second outer surface of the PTC heating element.

2. The electric heating device according to claim 1, wherein the at least one receiving pocket tapers towards a lower, closed end thereof, and wherein spring segments, provided at the lower end of the receiving pocket, project less far from a plane formed by the metal strip than those spring segments provided at an upper end of the receiving pocket.

3. The electric heating device according to claim 1, wherein the spring segments abut against one of the inner surfaces.

4. The electric heating device according to claim 1, wherein between three and six spring segments are provided vertically aligned between the lower end of the receiving pocket and the upper end of the receiving pocket.

5. The electric heating device according to claim 1, wherein the spring segments are provided adjacently to one another in parallel rows.

6. The electric heating device according to claim 1, wherein a heater housing, made of an insulating material, joins the PTC element and the conductor tracks to form a unit and guides the pressure element in a slidable manner.

7. The electric heating device according to claim 1, wherein free spaces, pressed free by the spring segments, are filled with a thermally conductive material.

* * * * *